July 10, 1928.

A. W. SCOTT ET AL 1,676,465

LOCKING HANDWHEEL

Filed Dec. 11, 1924   3 Sheets-Sheet 1

Inventor
Harvey D. Geyer
Alva W. Scott

By Spencer Sewall & Hardman
his Attorneys

July 10, 1928.

A. W. SCOTT ET AL 1,676,465

LOCKING HANDWHEEL

Filed Dec. 11, 1924

Inventor
Harvey D. Geyer
Alva W. Scott
By Spencer Sewall & Hardman
his Attorneys July 10, 1928.  
A. W. SCOTT ET AL  
1,676,465  
LOCKING HANDWHEEL  
Filed Dec. 11, 1924  3 Sheets-Sheet 3
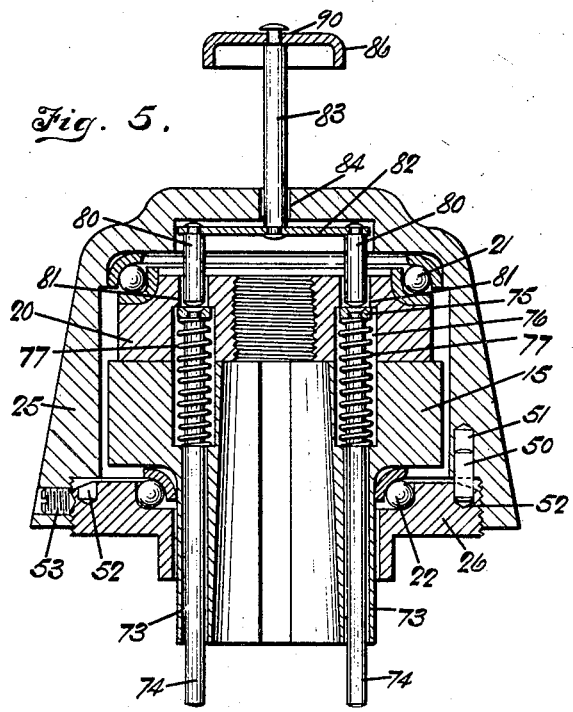
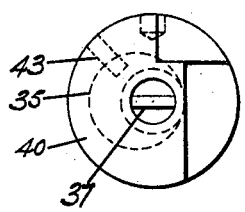
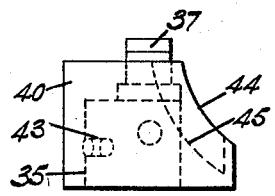
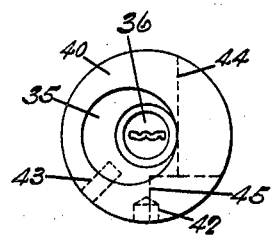
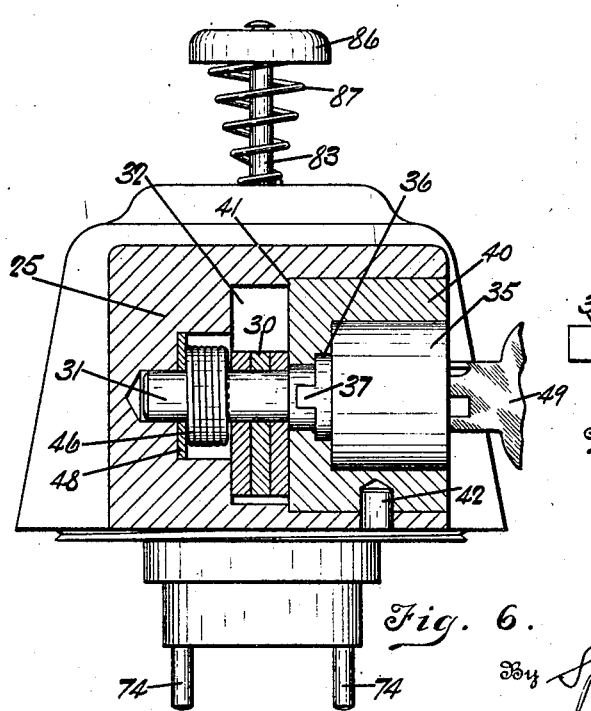
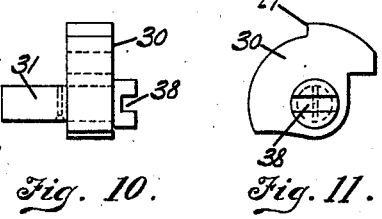
Inventor  
Harvey D. Geyer  
Alva W. Scott  
By Spencer Sewall & Hardman  
his Attorneys Patented July 10, 1928.

1,676,465

UNITED STATES PATENT OFFICE.

ALVA W. SCOTT AND HARVEY D. GEYER, OF DAYTON, OHIO, ASSIGNORS TO THE INLAND MANUFACTURING COMPANY, OF DAYTON, OHIO, A CORPORATION OF DELAWARE.

LOCKING HANDWHEEL.

Application filed December 11, 1924. Serial No. 755,182.

This invention relates to locking handwheels and is especially adapted for steering wheels for motor vehicles to prevent unauthorized use thereof.

This invention embodies a number of improvements over the locking wheel disclosed in application, Serial No. 640,783 by Harvey D. Geyer and Alva W. Scott, filed May 22, 1923.

A feature of this invention is the simple and efficient form of the locking bolt and lock mechanism which occupies only a small space and hence may be encased and protected by a protective casing of relatively small size.

Another feature is the provision of a key controlled swinging or rotary bolt for rendering the wheel either rotatably fixed or loose upon its shaft, the same bolt being also used to control the means for preventing an unauthorized person from removing the wheel from its shaft.

Another feature is the provision of a wheel and lock mechanism which may be completely assembled before being attached to the steering shaft and which may then be easily and quickly attached to the steering shaft by holding the locking key in a certain position.

Another feature is the provision of a retaining ring or cover plate which is assembled upon the wheel mechanism when the wheel is inverted and which is locked against removal by gravity operated means when the wheel is in normal position, whereby said wheel mechanism may be disassembled only when detached from its steering shaft.

Another feature is the provision of two ball bearings, one being placed on top of an enlarged retaining nut for anchoring the socketed head upon the steering shaft, whereby the two ball bearings are spaced a greater distance apart and hence are more efficient in holding the wheel against possible jamming of the bearings by lateral cocking of the wheel.

Another feature is the provision of horn switch operating linkage which extends through apertures in the socketed head and nut and out through the top of the wheel and yet permits relative rotation of the nut and head whereby the wheel mechanism may be secured to the steering shaft with the horn switch mechanism in place.

Further objects and advantages of the present invention will be apparent from the following description, reference being had to the accompanying drawings, wherein a preferred form of embodiment of the present invention is clearly shown.

In the drawings:

Fig. 5 is a section on line 5—5 of Fig. 3 and shows certain parts of the horn button projecting above the protective shell.

Fig. 6 is a section on line 6—6 of Fig. 3 but showing the barrel lock and bolt shaft in elevation.

Figs. 7, 8 and 9 are detail views of the barrel lock and bushing therefor, Fig. 9 being the outer end elevation, Fig. 8 the plan view thereof, and Fig. 7 the inner end elevation thereof.

Fig. 10 is a side elevation of the swinging bolt and shaft therefor, and

Fig. 11 is an end elevation thereof.

In the drawings, similar reference characters refer to similar parts throughout the several views.

Figure 1:
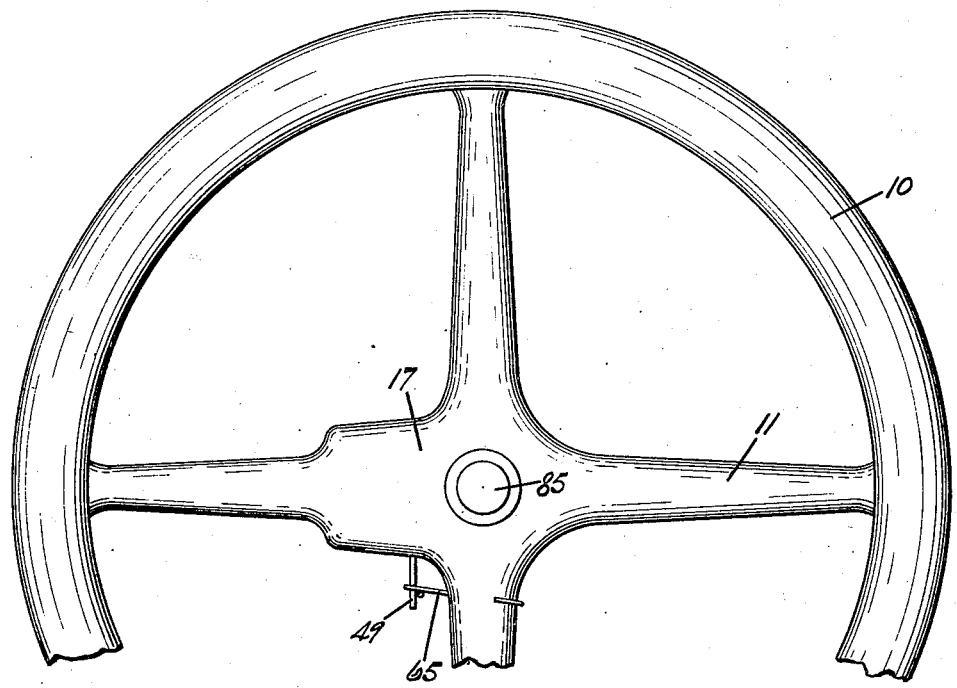
Fig. 1 is a plan view of a locking steering wheel built according to this invention.

Numeral 10 designates the steering wheel rim having a metal spider 11 rigidly secured thereto. The steering shaft 12 has an upper tapered end 13 (see Fig. 4) and a threaded portion 14 at its topmost end. A journal head 15 fits snugly down over the tapered end 13 of the shaft 12 and is keyed thereto by the key 16. A nut 20 is screwed upon the threaded end 14 and thus firmly anchors the head 15 against axial removal from the shaft 12.

Figure 4:
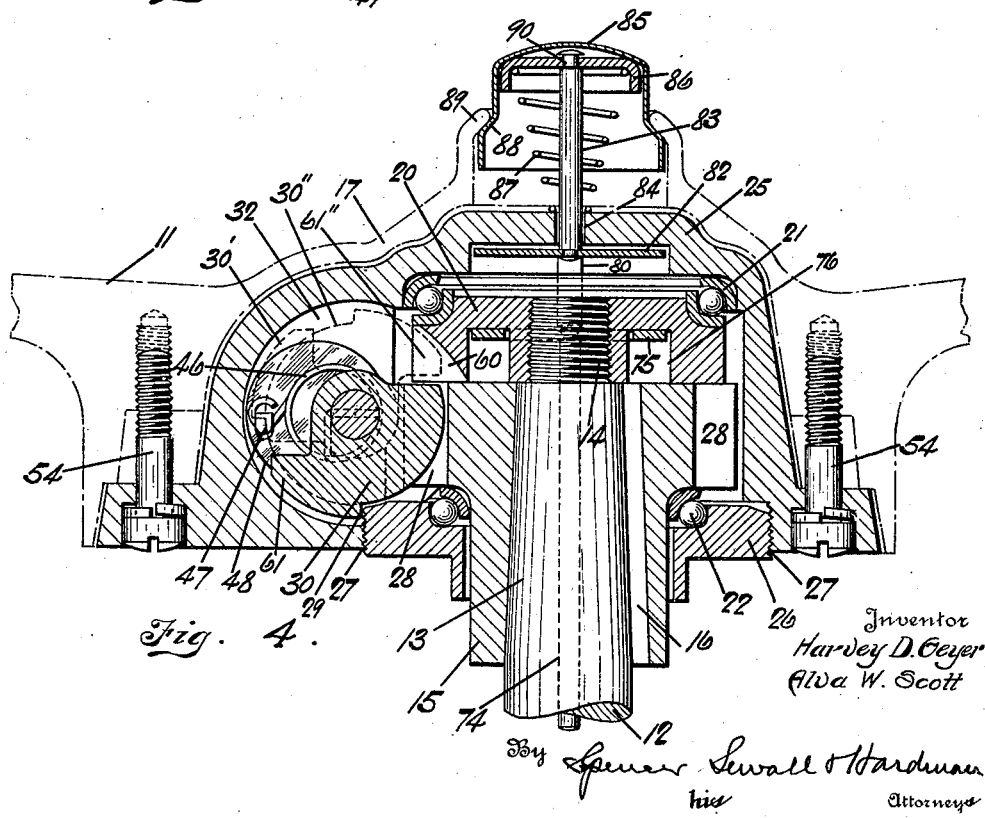
Fig. 4 is a section on line 4—4 of Fig. 3 and shows the wheel spider proper in dot and dash lines.

A hardened steel shell member 25 is journaled upon the head 15 and nut 20 by means of the upper ball bearing 21 and the lower ball bearing 22, as clearly illustrated in Figs. 4 and 5. This shell member 25 is provided with a bottom cover plate 26 which has threaded engagement therewith as shown at 27, which threaded engagement permits the proper adjustment of the ball bearings 21 and 22 at any time, as will be readily understood from the drawings.

Figure 3:
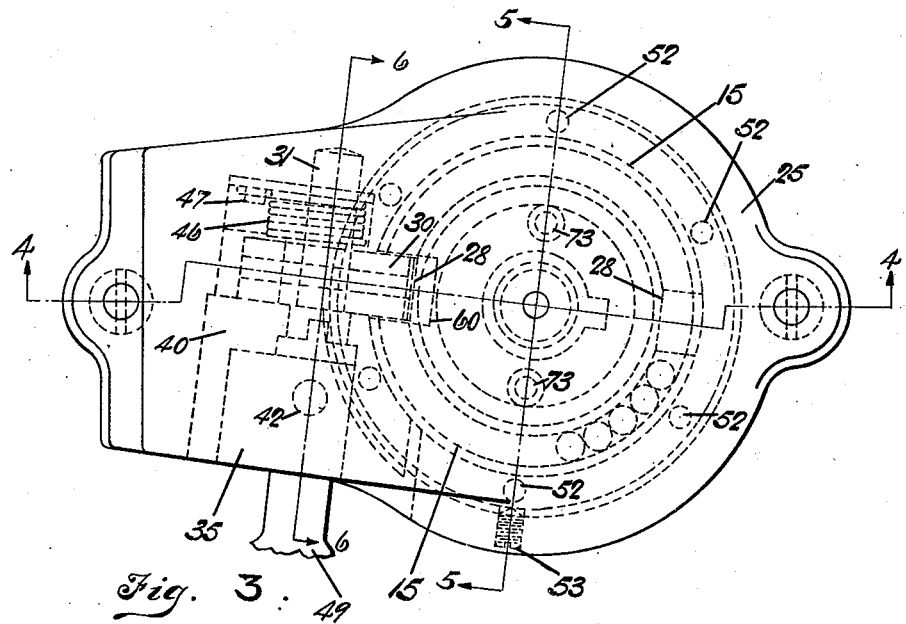
Fig. 3 is a top view on an enlarged scale of the protective shell and shows the interior mechanism in dotted lines.

The head 15 is provided with one or more lateral recesses 28 (two being shown in Figs. 3 and 4) to receive a locking bolt 30 for locking the shell 25 fixed to said head 15 or to permit relative rotation therebetween. The bolt 30 (preferably made of three layers of stamped sheet steel as shown in Fig. 6) is rigidly fixed upon the bolt pin 31, the ends of which pin 31 serve as journals for mounting the bolt in the protective shell 25 so that it may be swung to various positions in the bolt chamber 32 as will presently be described (see Fig. 6).

A key controlled barrel lock 35 is mounted at one end of pin 31 and the rotatable barrel 36 of said lock is held in driving engagement with pin 31 by the flat lug 37, extending within the groove or slot 38 in pin 31. In machining the bolt chamber 32 the metal of shell 25 is cut away at the right side as viewed in Fig. 6, which thus facilitates the proper machining of chamber 32 as well as the other recesses in shell 25 clearly shown in Fig. 6. This cut away metal is replaced by a hardened steel bushing 40 which is pressed into place against the annular shoulder 41 and held retained in its proper position by the driven pin 42 whose outer end lies flush with the bottom of shell 25 and hence cannot be removed by a thief after once being driven into place. The stationary bushing of lock 35 is permanently held in place in the steel bushing 40 by a small driven pin 43 as clearly shown in Figs. 8 and 9. It will be clear from the plan view shown in Fig 3 that the bushing 40 must have an arcuate portion 44 cut out of one side thereof in order to clear the head 15, and a second and deeper arcuate portion 45 cut out in order to clear the bottom cover plate 26 and so permit its assembly upon the shell 25.

A coil spring 46 surrounds pin 31 and has one end secured to said pin while the opposite end is held stationary by means of lug 47 on the fixed plate 48. This coil spring 46 urges the bolt 30 to rotate counterclockwise into recess 28 until stopped by the shoulder 29 abutting the edge of plate 26 (as shown in full lines in Fig. 4), and thus fix the steering wheel in driving position upon the shaft. In order to render the wheel loose or inoperative it is necessary to swing the bolt 30 about 90 degrees in a clockwise direction to the position 30' (shown in dotted lines) by means of the key 49 and withdraw the key from the lock 35. The lock tumblers (not shown) will then hold the bolt 30 in its inoperative position and thus prevent any unauthorized use of the machine. When it is again desired to render the wheel operative the key 49 is inserted thus releasing the lock tumblers, whereupon the coil spring 46 will swing bolt 30 against the cylindrical side of head 15. The wheel is then rotated until one of the recesses 28 registers with the bolt 30 whereupon said bolt will snap into the recess 28 and the wheel is then fixed in driving relation to the shaft 12.

The method of assembling the parts of the wheel lock mechanism together and attaching it to the steering shaft will now be described.

The protective shell 25 is inverted and the ball bearing 21 and the nut 20 inserted therein, the bolt 30 being in the position 30'. The socketed head 15 is next dropped in against the nut 20. The bottom cover plate 26 and the ball bearing 22 are then inserted and the cover plate 26 is screwed into the shell 25 until the proper adjustment of both ball bearings 21 and 22 is obtained. A gravity operated pawl 50 is inserted loosely in the recess 51 in shell 25 before cover plate 26 is inserted as above described (see Fig. 5). The cover plate 26 is provided with a number of spaced recesses 52 which register with the gravity pawl 50 as plate 26 is screwed into place. However since the shell 25 is held in inverted position while cover plate 26 is being screwed into place it will be obvious that pawl 50 will fall into the bottom of its recess 51 and so will not prevent the rotation of cover plate 26. When the shell is again held in normal position the pawl 50 will fall against cover plate 26, and if said plate is turned in an attempt to remove it when in normal position the pawl 50 will drop into the first recess 52 with which it registers and thus lock the cover plate against removal. If desired, a small set screw 53 accessible from the outside may be provided for holding the exact adjustment of cover plate 26 upon the bearings 21 and 22.

The steering wheel rim and spider are preferably attached to the protective shell 25 after the above described assembly has been made, but obviously they could be attached before such assembly since the entire wheel could then be easily inverted for the assembling of the lock mechanism as above described. The metal spider 11 is preferably provided with a central housing 17 which surrounds and conceals the protective shell 25 except for the opening at the bottom of said housing which permits the housing 17 to be set down over the protective shell 25. The spider 11 may be secured to the shell 25 in any suitable manner. In the drawings the two screws 54 serve this purpose well since they are spaced quite far apart to easily transmit the driving torque from the wheel to the shell 25 and also are substantially concealed from view.

The assembled wheel is attached to the steering shaft 12 as follows: The assembled wheel is placed over the tapered shaft 12 with the key 16 in its proper position, the top thread of the threaded portion 14 abutting the bottom thread of nut 20. The nut 20 is provided with a recess 60 (see Fig. 4) which may register with the projecting heel 61 of bolt 30 when said bolt 30 is rotated about 180 degrees from its driving position to the position 30″ as clearly shown in dotted lines in Fig. 4. The bolt 30 is swung into engagement with the recess 60 by means of key 49. This engagement is easily obtained by exerting a clockwise torque on the key 49 and rotating the wheel until the heel 61 registers with and snaps into the recess 60. The wheel may now be turned loosely about the head 15 since the bolt 30 is out of engagement with the head 15 and the bolt 30 will act as a wrench to screw nut 20 down upon the shaft 12 until head 15 is pressed home upon the tapered portion 13 of shaft 12. The key is then released to permit bolt 30 to move back into its driving position under the urge of coil spring 46 and the wheel is then ready for use. It will be obvious that the wheel may be removed from the shaft 12 by the use of the key 49 in a similar manner.

Figure 2:
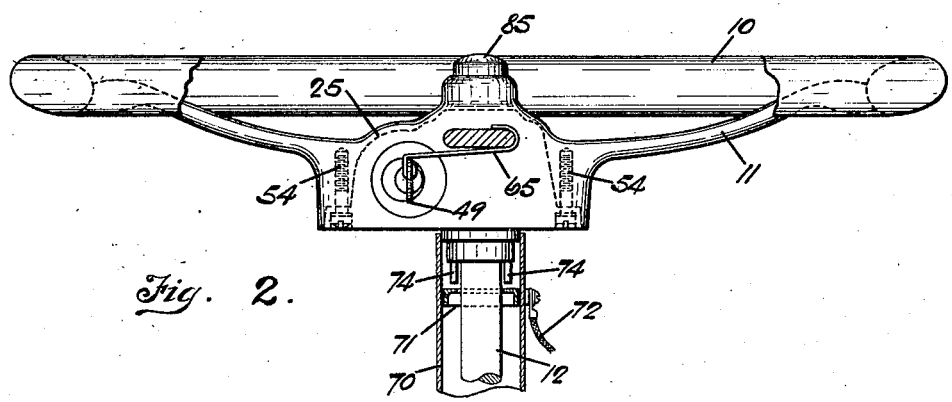
Fig. 2 is a side view thereof with certain parts broken away, the lock key being shown in Figs. 1 and 2 secured by a temporary attachment in the position for attaching the wheel to the steering shaft.

In Figs. 1 and 2 there is shown a short piece of bent wire 65 for holding key 49 in such position that the bolt 30 is in engagement with nut 20 as above described. The wheels may be shipped from the factory with the key 49 wired in this position. In order to attach the wheel to an automobile steering shaft, the user need only remove his old wheel, place this wheel upon the threaded end of the steering shaft and rotate it a few turns until the nut is screwed down and then cut or otherwise remove the wire 65. The wheel is then completely assembled upon the steering shaft and ready for use.

The horn switch mechanism shown in the drawings will now be described, however the presence or absence of such switch mechanism does not alter the method of assembly or operation of the locking mechanism as described hereinabove. The steering shaft 12 is provided with a stationary housing 70 (see Fig. 2). An insulated contact ring 71 is suitably secured within said housing 70 and is connected to a wire 72 leading to an electric horn which has a second terminal leading to the electric battery. The head 15 is provided with two apertures 73 in which the two movable contact pins 74 are reciprocable. The two pins 74 are riveted at their upper ends to the annular ring 75 (see Fig. 5), which ring 75 is reciprocable in the annular groove 76 cut in the lower part of nut 20. The two small coil springs 77 normally hold ring 75 in its up position against the top wall of annular groove 76 as shown in the drawings. The ring 75 may be depressed by the two short pins 80 which are reciprocable through the two small apertures 81 through the nut 20. The short pins 80 are riveted to the small disc 82, which in turn is reciprocated by the central pin 83 extending through the small central aperture 84 in the protective shell 25. The horn button 85 is mounted upon the upper end of pin 83 by means of the flanged disc 86 which is rotatably attached to the upper end of pin 83 at 90 as clearly shown in the drawings. A light coil spring 87 is preferably provided to prevent looseness and rattling of the horn button by causing the shoulder 88 thereof to be pressed against the corresponding shoulder 89 on the spider 11. It will now be clear that when the wheel is turned loosely about head 15, the horn button 85 and disc 86 may rotate with the wheel by turning about the loose connection 90 while all the rest of the switch operating mechanism remains stationary. When the wheel is locked to the head 15 the pins 74 will rotate with the shaft 12 during the steering of the vehicle but it will be obvious that, for any position of the wheel, the pins 74 will engage contact ring 71 when the horn button 85 is depressed and thus ground the horn circuit through the steering shaft 12. If it is desired to use this switch mechanism in an ungrounded horn circuit the ring 71 may be divided into two separately insulated semi-circular segments, each segment having an insulated wire leading thereto, and electrically insulate pins 74 and ring 75 from the grounded metal parts. The two pins 74 will then bridge across the two segments when the horn button 85 is depressed, regardless of the position of the steering wheel, and thus complete the electric circuit without grounding the same.

It will be noted that the slip connection between the short pins 80 and the annular ring 75 will permit the nut 20 to be screwed down upon the threaded shaft 12 while head 15 is held from rotation by the key 16, as described above for the assembly of the wheel upon the steering shaft.

While the form of embodiment of the present invention as herein disclosed, constitutes a preferred form, it will be understood that other forms might be adopted, all coming within the scope of the claims which follow.

What is claimed is as follows:—

1. In a wheel and shaft locking means, a head attached to said shaft, a nut threaded upon said shaft above said head and preventing axial removal of said head, a wheel having a central housing surrounding and preventing access to said nut, a rotary locking bolt having two positions for rendering said wheel fixed or loose upon said shaft, said bolt being capable of being swung into a third position to engage said nut whereby said nut may be turned upon the threads on said shaft by rotating the wheel.

2. In a wheel and shaft locking means, a head attached to said shaft, a nut threaded upon said shaft above said head and preventing axial removal of said head, a wheel having a central housing surrounding and preventing access to said nut, a key operated rotary bolt capable of being swung into engagement with said nut whereby said nut may be turned upon the threads on said shaft by rotating said wheel.

3. In a wheel and shaft locking means, a head attached to said shaft, a nut threaded upon said shaft above said head and preventing axial removal of said head, a wheel having a central housing surrounding and preventing access to said nut, a key operated rotary bolt capable of being swung into assembling position for operative engagement with said nut, into a loose position for rendering said wheel loose upon said shaft, and into a driving position for operative engagement with said head whereby said wheel is put in driving engagement with said shaft.

4. In a wheel and shaft locking means, a head attached to said shaft, a nut threaded upon said shaft above said head and preventing axial removal of said head, a wheel having a central housing surrounding and preventing access to said nut, a key operated rotary bolt capable of being swung into assembling position for operative engagement with said nut, into a loose position for rendering said wheel loose upon said shaft, and into a driving position for operative engagement with said head whereby said wheel is put in driving engagement with said shaft, said bolt having a spring acting thereupon normally holding it out of said assembling position and in said driving position.

5. In a wheel and shaft locking means, a wheel, a protective shell connected to the wheel and rotatable therewith, a head encased by said shell and having an exposed aperture adapted to be set over said shaft, a nut encased by said shell and adapted to be threaded upon said shaft to retain said head thereupon, and a key operated pawl encased by and rotatable with said shell capable of engagement with said nut, whereby said head and nut may be secured to said shaft while assembled within said protective shell.

6. In a lock steering wheel, a wheel having a protective shell at its central portion, a journal head protected by said shell and adapted to be anchored upon a steering shaft, a retaining plate for preventing withdrawal of the head from said shell, and gravity controlled means for locking said plate against removal from said shell, said means being held down by gravity in locking position when the wheel is held in normal position.

7. In a lock steering wheel, a wheel having a protective shell at its central portion, a journal head protected by said shell and adapted to be anchored upon a steering shaft, a retaining plate for preventing withdrawal of the head from said shell, and gravity controlled means for locking said plate against removal from said shell, said means being held down by gravity in locking position when the wheel is held in normal position and out of locking position when the wheel is held in inverted position.

8. In a handwheel and shaft locking means, a wheel having a protective shell at its central portion, a journal head rotatably mounted within said shell, and adapted to be fixed to a shaft, locking means for locking said wheel fixed or loose upon said head, a retaining means for preventing withdrawal of the head from said shell, and a gravity controlled detent held down by gravity in locking position and positively preventing removal of said retaining means when said wheel is held in normal position.

9. In a wheel and shaft locking means, a shaft adapted to have a wheel mounted thereupon, a wheel having a protective shell and a journal head and lock mechanism associated therewith all encased within said protective shell while detached from said shaft, gravity controlled retaining means for preventing removal of said head from said shell when the wheel is held in normal position, and means controlled by said lock mechanism for mounting said journal head upon said shaft while said head is assembled within said shell.

In testimony whereof we hereto affix our signatures.

ALVA W. SCOTT.
HARVEY D. GEYER.